(No Model.)　　　　　　　　　　　　　　　　　　　2 Sheets—Sheet 1.
W. & O. C. MITCHELL.
METHOD OF AND MEANS FOR UNLOADING HAY AND GRAIN IN BARNS.
No. 274,010.　　　　　　　　　　　　　　Patented Mar. 13, 1883.
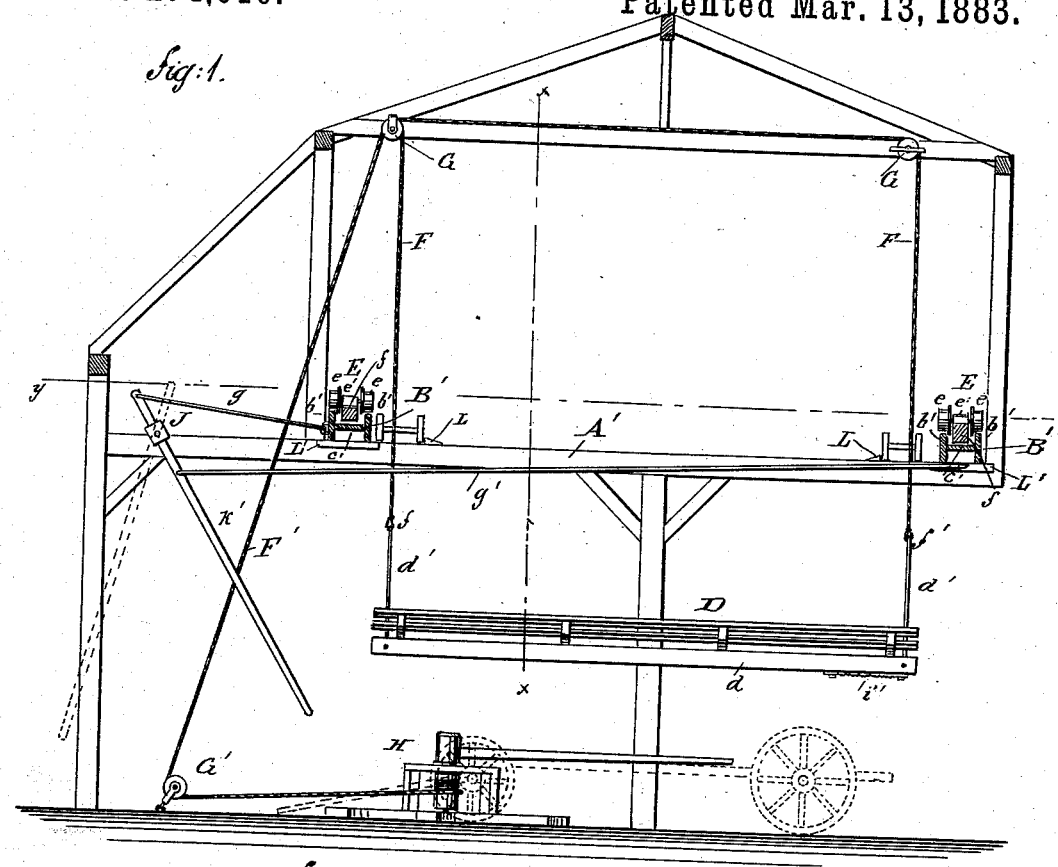
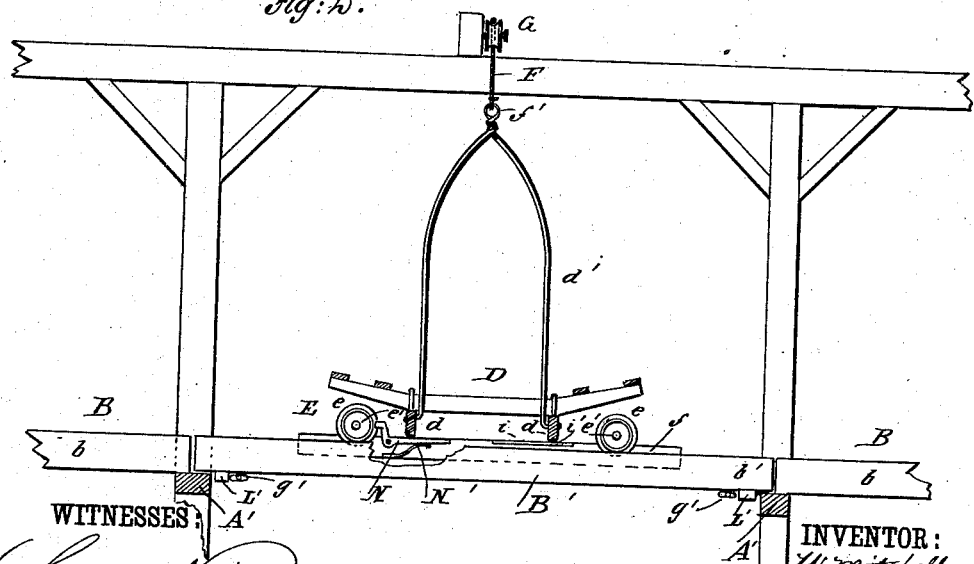
WITNESSES　　　　　　　　　　　　　　　　　INVENTOR:
Chas. Niola　　　　　　　　　　　　　　　　　W. Mitchell
C. Sedgwick　　　　　　　　　　　　　　　　　O. C. Mitchell
　　　　　　　　　　　　　　　　　　　BY Munn & Co
　　　　　　　　　　　　　　　　　　　　　ATTORNEYS.
N. PETERS. Photo-Lithographer. Washington. D. C.

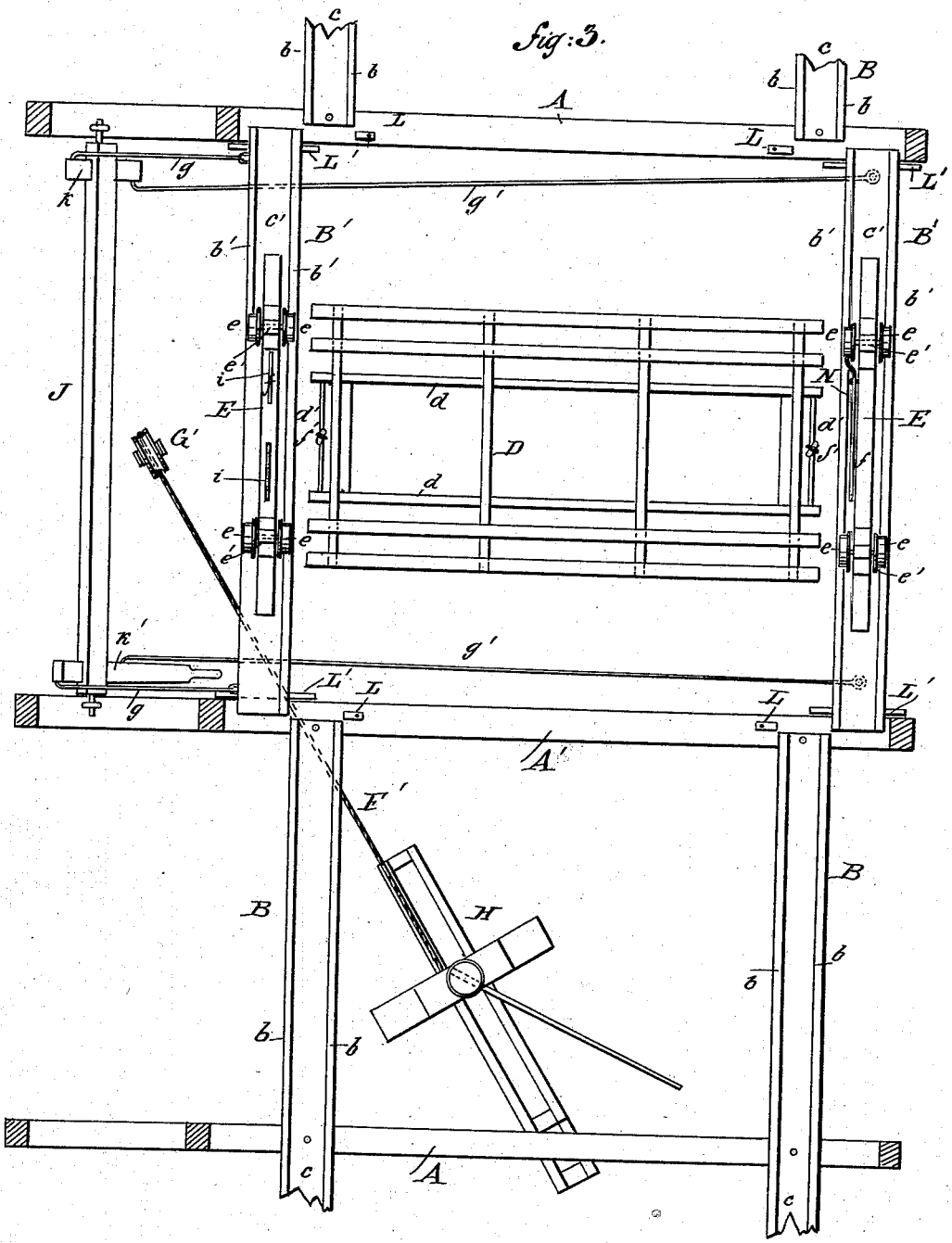

UNITED STATES PATENT OFFICE.

WRAY MITCHELL AND OSCAR C. MITCHELL, OF RAPIDS, NEW YORK.

METHOD OF AND MEANS FOR UNLOADING HAY AND GRAIN IN BARNS.

SPECIFICATION forming part of Letters Patent No. 274,010, dated March 13, 1883.

Application filed September 22, 1882. (No model.)

*To all whom it may concern:*

Be it known that we, WRAY MITCHELL and OSCAR C. MITCHELL, both of Rapids, in the county of Niagara and State of New York, have invented a new and Improved Method and Means of Unloading Hay and Grain in Barns, of which the following is a full, clear, and exact description.

Our improved method of unloading hay or grain in barns consists in elevating the rack upon which the hay or grain is loaded from the wagon standing on the floor of the barn to the height of the main beams of the barn, and then shifting the rack, with its load, over the mow and unloading the rack either by hand or by a horse-fork or by dumping. The rack, when unloaded, is then to be shifted back over and lowered again upon the wagon.

The means of elevating the rack and its load from and of lowering the rack to the wagon consists of a capstan (or other suitable power) and suitably-arranged ropes or chains and pulleys, the elevating ends of the ropes or chains being adapted to be hooked into the standards of or otherwise attached to the rack.

The means of shifting the rack to and from the unloading position over the mow consists of trucks running upon tracks supported upon the beams of the barn, the sections of the tracks immediately over the barn-floor being movable, and adapted, by suitable shaft-and-lever mechanism, to be moved in opposite directions, for permitting the passage of the rack between them, and for bringing the said sections and the trucks under the rack for supporting it.

The trucks are provided with brakes for preventing the empty trucks from moving on the tracks, which brakes will be automatically applied to the wheels upon lifting the rack from the trucks.

Reference is to be had to the accompanying drawings, forming part of this specification, in which similar letters of reference indicate corresponding parts in all the figures.

Figure 1 illustrates in sectional elevation our invention attached to the beams and floor of a barn, the parts being shown in the positions they occupy while the rack is being raised and lowered. Fig. 2 is a sectional elevation on the line $x$ $x$ of Fig. 1, the rack being shown resting upon the trucks; and Fig. 3 is a sectional plan view taken on the line $y$ $y$ of Fig. 1.

A A′ A′ represent three of the main beams of the barn, the beams A′ A′ being the two nearest the barn-floor.

On the main beams A A′ are secured the duplicate tracks B B, which are formed of the side flanges $b$ $b$ and the cross-plates $c$.

B′ B′ represent the floor-sections of the track, that rest at their ends upon the beams A′ A′. These sections are made like the tracks B B, (of the side flanges $b'$ $b'$ and cross-plates $c'$,) and match them at the ends, and these sections B′ are adapted to be moved on the beams A′ A′ in opposite directions—that is, away from each other for permitting the wagon-rack D to pass between them, up or down, and toward each other for bringing them under the rack for supporting it on the trucks E E, and for continuing or connecting the tracks B B, so that a continuous track from the sections B′ B′ will be formed for moving the rack on the trucks over the mow for unloading.

The trucks E E are formed of the bars $f$, flanged wheels $e$ $e$, and short axles $e'$ $e'$, which are journaled in suitable bearings or boxes secured to the upper side of the bars, so that the bars $f$, when the trucks are in place on the tracks, are adapted to run between the flanges of the tracks, as shown, and thus guide the trucks and prevent all danger of their running off from the tracks. One of the trucks is provided with the plates $i$ $i$, on which the notched plates $i'$ $i'$ (set into the lower edge of one of the bed-pieces $d$ $d$ of the rack D) are adapted to rest, as shown in Fig. 2, for preventing one truck getting ahead of the other in moving the rack along the tracks.

F F represent the elevating ropes or chains, which pass over the pulleys G G at the roof, and are attached to the rope or chain F′, which passes over the pulley G′, secured to the floor of the barn, and from thence pass around the winding-post or capstan H, secured to the barn-floor, or set outside of the barn, as circumstances require or as may be found most convenient. The free ends of the ropes or chains F F are provided with hooks or suitable means for ready attachment to and detachment from the standards $d'$ $d'$ of the rack D, which standards are formed with the rings or eyes $f'$, for receiving the hooks of the ropes or chains F F.

Upon the beams A' A', in front of the sections B' B' of the track, is journaled the rock-shaft J, which is provided at one end with the cross-piece K, and at the other with the lever K', which cross-piece and lever extend through and above the shaft, as shown in Figs. 1 and 3. The cross-piece K and the lever K' are connected above the shaft J to the nearest section B' of the tracks by the short connecting-rods $g\ g$, and below the shaft J they are connected to the farthest section B' by means of the long connecting-rods $g'\ g'$, which rods are the same distance below the shaft J, where they join the cross-piece and lever, that the connecting-rods $g\ g$ are above it, where they join the said lever and cross-piece, so that upon turning the shaft J, by forcing the lever K' forward to the position shown in dotted lines in Fig. 1, the sections B' B' of the track will be simultaneously moved by the connecting-rods an equal distance toward each other, and upon reversing the movement of the lever they will be simultaneously moved an equal distance away from each other, as will be clearly understood from Fig. 1.

L L represent stops secured upon the beams A' A' to limit the distance the sections B' B' can be moved toward each other, and L' L' represent guides secured to the lower side of the sections, near their ends, so as to run against the side faces of the beams A' A', for guiding the sections in their backward and forward movement, and for preventing them from having any endwise movement.

In using our invention the trucks E E are placed upon the sections B' B' of the tracks, and the said sections are moved away from each other to the position shown in Figs. 1 and 3. The wagon, with its load, is now drawn into the barn, and the horses detached from the wagon and attached to the lever of the capstan. The ropes or chains F F are now to be attached to the standards $d\ d$ of the rack, and the capstan turned until the rack and load is elevated a short distance above the sections B' B' of the tracks and the trucks E E resting thereon. The lever K' is now to be forced forward to the position shown in dotted lines in Fig. 1, which will move the sections B' B' toward each other against the stops L L, so that their ends will come in line with the ends of the rails B B and bring the trucks E E under the ends of the rack. The rack will now be lowered upon the trucks and shifted upon them, with its load, along the sections B' B' and stationary tracks B B to the position desired over the mow, where the load may be easily removed from the rack by hand, by a horse-fork, or by dumping, and dropped without extra handling into the mow where it is to lie. The rack having been unloaded, it is to be moved back upon the trucks over the barn-floor and first raised slightly off from the trucks. The sections B' B', with the trucks, are then to be moved away from each other by forcing the lever K' back to the position shown in full lines in Fig. 1, and the rack D then lowered by the ropes or chains F F upon the wagon again, as illustrated in full and dotted lines in Fig. 1.

N N represent the bent brake-levers, pivoted to the sides of the bars $f\ f$ of the trucks in such manner that their forward ends are adapted to impinge against one of the wheels $e\ e$ of the trucks. The rear ends of the levers rest upon the springs N' N', which normally hold the rear ends of the levers elevated above the level of the upper faces of the bars $f\ f$, and the forward ends applied to the wheels, so that when the rack is lowered upon the trucks the rear ends of the levers will be depressed and forward ends moved back from the wheels by the weight of the rack, and when the rack is raised the springs will throw the levers again in contact with the wheel, which will hold the trucks in their proper position on the track-sections for the next load.

In this manner and by this means it will be seen that the loads of any kind of farm produce may be unloaded and moved away by the labor of one man and with comparative ease, and that the devices employed are simple, may be handled easily and quickly, and that they occupy but small space in the barn.

The capstan may be movable, so that it may be located inside or outside of the barn, as desired.

Having thus described our invention, what we claim as new, and desire to secure by Letters Patent, is—

1. The tracks B B, secured to the beams of the barn, in combination with the sliding track-sections B' B', trucks E E, and means, substantially as described, for elevating and lowering the rack, as and for the purposes set forth.

2. The track-sections B' B', adapted to slide in opposite directions upon the beams A' A', in combination with the tracks B B, attached to the beams of the barn, substantially as and for the purposes set forth.

3. The tracks B B and sections B' B' of the track, in combination with the rock-shaft J, cross-piece K, lever K', and connecting-rods $g\ g'$, whereby the sections may be moved simultaneously in opposite directions, substantially as described.

4. The truck E, formed of the bar $f$, flanged wheels $e\ e$, and axles $e'\ e'$, journaled in blocks secured to the upper side of the bar $f$, substantially as and for the purposes set forth.

5. The combination, with the track B, formed of the side flanges $b\ b$ and cross-piece $c$, of the trucks E, having the bar $f$ suspended under the axles to run between the flanges, substantially as and for the purposes set forth.

6. The bar $f$ of the truck E, provided with the plate $i$, in combination with the bed-piece $d$ of the rack, provided with the plate $i'$, substantially as and for the purposes set forth.

7. The rack D, having the standards $d'$ $d'$, provided with the eyes $f'$ $f'$, for the attachment thereto of the elevating ropes or chains F F, substantially as described.

8. The trucks E, provided with the brake-levers N and springs N', for automatically holding the trucks in place when the rack is raised off from the trucks, as and for the purposes set forth.

9. The capstan H, ropes or chains F F F', and pulleys G G G', in combination with the tracks B B, movable track-sections B' B', and the trucks E E, substantially as and for the purposes set forth.

10. The combination, with the tracks B B and stops L L, of the movable track-sections B' B', provided with the guides L' L', substantially as and for the purposes set forth.

11. The method herein described of unloading and moving away hay or grain, consisting in raising the rack and its load bodily from the wagon above the beams of the barn, and then shifting it upon the trucks running upon suitable tracks over the mow, and then unloading the rack, as set forth.

WRAY MITCHELL.
OSCAR CARLTON MITCHELL.

Witnesses:
HENRY ERNEST,
J. E. ROBINSON.